United States Patent [19]
Carson

[11] 3,832,517

[45] Aug. 27, 1974

[54] METHOD OF WELDING COATED WIRES TO ELECTRICAL CONDUCTORS

[75] Inventor: Randolph Charles Carson, Cypress, Calif.

[73] Assignee: Beckman Instruments, Inc., Fullerton, Calif.

[22] Filed: Nov. 2, 1972

[21] Appl. No.: 303,134

[52] U.S. Cl. .................................................. 219/92
[51] Int. Cl. .......................... B23k 9/28, B23k 11/10
[58] Field of Search ................................. 219/92, 91

[56] References Cited

UNITED STATES PATENTS

| | | | |
|---|---|---|---|
| 2,288,348 | 6/1942 | Funk | 219/92 X |
| 2,977,672 | 4/1961 | Telfer | 219/92 X |
| 3,337,711 | 8/1967 | Garscia | 219/92 |
| 3,353,263 | 11/1967 | Helms | 219/92 |
| 3,384,958 | 5/1968 | Christian et al. | 219/92 X |
| 3,578,940 | 5/1971 | Sands | 219/91 |
| 3,627,970 | 12/1971 | Weatherman et al. | 219/92 |

*Primary Examiner*—J. V. Truhe
*Assistant Examiner*—Hugh D. Jaeger
*Attorney, Agent, or Firm*—R. J. Steinmeyer; J. M. Thomson

[57] ABSTRACT

A fine metallic wire having a thermoplastic insulative coating is welded to a larger metallic conductor by inserting the wire between opposing surfaces of the conductor and applying to the conductor an electrode heated by electrical current to a temperature above the melting point of the conductor. Heat from the electrode causes the conductor to fuse to the wire. The coating on the wire is softened by the heat of the conductor and displaced by the conductor so that electrical conductivity between the conductor and the wire is established. Surprisingly, the mechanical strength and electrical conductivity of the weld are not adversely affected by the coating, which in the prior art was always removed prior to welding.

1 Claim, 4 Drawing Figures

METHOD OF WELDING COATED WIRES TO ELECTRICAL CONDUCTORS

BACKGROUND OF THE INVENTION

Extending from many miniature electrical components are fine lead wires which must be connected to other conductors to complete an electrical circuit. The wires have a diameter ranging from about 0.01 to 0.0001 inch and, as supplied commercially, have an insulative coating of a thermoplastic material, such as a polyimide. Prior to this invention, the insulative coating was always removed before the wires were connected to the conductors. The prior art teaches that wires should be cleaned of all foreign material before being connected to other conductors in order to ensure good mechanical strength and good electrical conductivity. The coating was usually removed by manual rubbing of the wire with an abrasive material, such as fine sandpaper. This manual operation was not only time consuming, but also often resulted in breaking of the lead wire. Hence, it is an object of this invention to provide a method of connecting such lead wires to other conductors without the necessity of removing the insulation before the connection is made.

SUMMARY OF THE INVENTION

In accordance with this invention, a metallic wire is welded to a larger metallic conductor, the wire having a diameter between 0.01 and 0.0001 inch and a thermoplastic insulative coating, by inserting the wire between two opposing surfaces of the conductor, applying a first electrode to the conductor with such force that intimate contact is established between the wire and the two opposing surfaces, the electrode having an electrical resistance such that the electrode is capable of being heated to a temperature above the melting point of the conductor by the passage of current through the electrode, establishing an alternating electrical circuit between the first electrode and a second electrode, the electrical circuit including at least a portion of the conductor, passing current between the electrodes such that the first electrode is heated to a temperature above the melting point of the conductor, whereby the conductor fuses to the wire, the coating on the wire being softened by the heat of the conductor and then displaced by the conductor such that electrical conductivity is established between the conductor and the wire.

BRIEF DESCRIPTION OF THE DRAWINGS

Referring to FIG. 1, a wire 10 is inserted into a tube 11 which serves as a terminal for the wire. The wire is made of a ductile, electrically conductive metal, such as aluminum, copper, silver or platinum, and has an insulative coating (not shown) of a thermoplastic material. The thermoplastic material is typically a polyimide, polyvinylformal, polyesterimide, or polyester. The tube is also made of an electrically conductive metal, such as copper, silver, or an alloy thereof.

FIG. 2 shows the wire and the tube after being welded together The weld is made by bringing an electrode 12 into contact with the tube 11 with sufficient force such that intimate contact is established between the wire and two opposing surfaces of the tube, and then passing electrical current between the electrode and another electrode 13. The amount of force required to establish intimate contact between the wire and the two opposing surfaces of the tube 11 can easily be determined by simple experiment, and usually is on the order of a few pounds. The upper electrode 12 is made of a material, such as tungsten or molybdenum, which has such electrical resistance that the material is heated to a temperature above the melting point of the material of the tube 11 by the passage of a suitable electrical current through the electrode 12. The lower electrode 13 is made of a highly conductive material, such as copper, and serves as a return for the electrical current, although it may also support the workpiece. As electrical current is passed between the electrodes 12 and 13, the upper electrode 12 is heated by the current to a temperature above the melting point of the material of the tube 11, whereby the tube fuses to the wire and the coating on the wire is softened by the heat of the tube and displaced by the tube such that electrical conductivity is established between the tube and the wire.

The tube is heated primarily by the sensible heat of the upper electrode 12, i.e., the heat generated by electrical current passing through the tube 11 is negligible.

Figure 1:
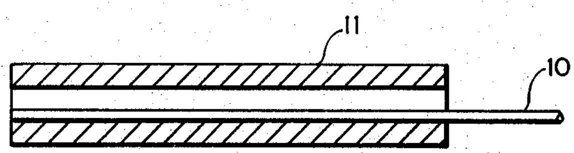
FIG. 1 is a sectional view of a wire inserted into a tubular conductor (terminal)
Figure 2:
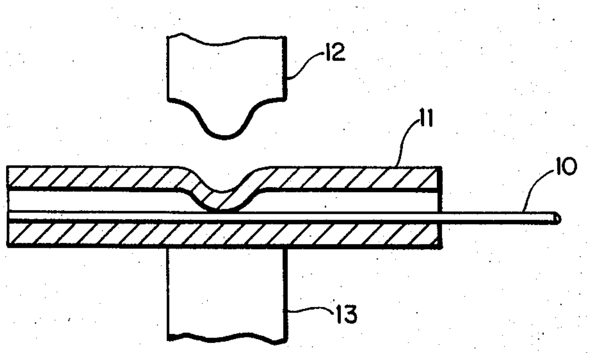
FIG. 2 is a sectional view of the tube and wire of FIG. 1 after being welded by means of two electrodes.
Figure 3:
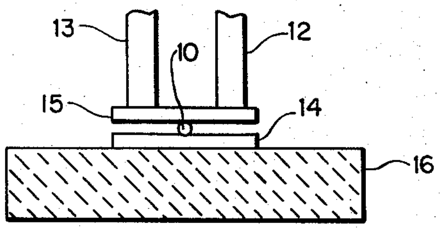
FIG. 3 is a sectional view of a wire between opposing elements of a conductor with two electrodes in contact with one of the elements.

FIG. 3 shows a wire 10 between two opposing elements 14 and 15 of a conductor. The wire 10, like the wire 10 of FIG. 1 is made of an electrically conductive metal and has a thermoplastic insulative coating. The elements 14 and 15, like the tube of FIG. 1, are made of an electrically conductive metal. The lower element 14 is bonded to a nonconductive substrate 16. Intimate contact between the wire and the elements is established by an electrode 12, which is like the upper electrode 12 of FIG. 2. A second electrode 13 serves the same purpose as the lower electrode 13 of FIG. 2.

Figure 4:
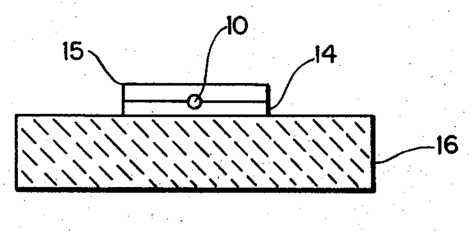
FIG. 4 is a sectional view of the wire and conductor of FIG. 3 after being welded by means of the electrodes.

FIG. 4 shows the wire 10 and the elements 14 and 15 of FIG. 3 after they have been fused together by the passage of electrical current between the electrodes 12 and 13. The coating on the wire is softened by the heat of the elements and displaced by the elements such that electrical conductivity is established between the elements and the wire.

Tests have shown that the mechanical strength and the electrical conductivity of connections made in accordance with this invention are at least as good as connections made under identical conditions wherein the insulative coating on the wire was removed prior to making the connections.

What is claimed is:

1. A method of welding a metallic wire to larger metallic conductor means having two opposing surfaces, the wire having a diameter between 0.01 and 0.0001 inch and a thermoplastic insulative coating, which method comprises inserting the wire between the two opposing surfaces of the conductor means, applying a first electrode to the conductor means with such force that intimate contact is established between the wire and the two opposing surfaces, the electrode having an electrical resistance such that the electrode is capable of being heated to a temperature above the melting point of the conductor means by the passage of current through the electrode, establishing an alternating electrical circuit between the first electrode and a second electrode, with the electrical circuit including at least a portion of the conductor means, passing alternating current between the electrodes such that the first electrode is heated to a temperature above the melting point of the conductor, whereby the conductor fuses the wire, with the coating on the wire being softened by the heat of the conductor and displaced by the conductor means such that electrical conductivity is established between the conductor means and the wire.

* * * * *